United States Patent
Li et al.

(10) Patent No.: US 11,838,828 B2
(45) Date of Patent: Dec. 5, 2023

(54) ULTRA-WIDEBAND ASSISTED PRECISE POSITIONING SYSTEM AND ULTRA-WIDEBAND ASSISTED PRECISE POSITIONING METHOD

(71) Applicant: PSJ INTERNATIONAL LTD., Tortola (VG)

(72) Inventors: Chao-Hsiang Li, Taichung (TW); Alexander I Chi Lai, Taipei (TW); Ruey-Beei Wu, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 342 days.

(21) Appl. No.: 17/412,520

(22) Filed: Aug. 26, 2021

(65) Prior Publication Data

US 2022/0386068 A1 Dec. 1, 2022

(30) Foreign Application Priority Data

May 19, 2021 (TW) ................................ 110118026

(51) Int. Cl.
*H04W 4/02* (2018.01)
*H04W 4/029* (2018.01)
(Continued)

(52) U.S. Cl.
CPC .............. *H04W 4/023* (2013.01); *G01S 5/14* (2013.01); *G01S 13/0209* (2013.01);
(Continued)

(58) Field of Classification Search
CPC .... G01S 13/765; G01S 13/46; G01S 13/0209; G01S 5/0257; G01S 5/14; G01S 13/87;
(Continued)

(56) References Cited

U.S. PATENT DOCUMENTS

2015/0045022 A1* 2/2015 Prechner ............... H04W 48/16
455/434
2018/0027386 A1 1/2018 Zampini, II
(Continued)

FOREIGN PATENT DOCUMENTS

EP 3089528 A1 11/2016
TW 201006290 A 2/2010

*Primary Examiner* — Congvan Tran
(74) *Attorney, Agent, or Firm* — Li & Cai Intellectual Property (USA) Office

(57) ABSTRACT

An ultra-wideband assisted precise positioning system and an ultra-wideband assisted precise positioning method are provided. The method includes: arranging a plurality of device nodes in a target area; configuring a central control device node to communicatively connect to the device nodes; configuring the device nodes to perform a positioning process to obtain measured distances and positioning positions to be corrected; and configuring a central control processor to execute a positioning algorithm. The positioning algorithm includes: obtaining the measured distances and the positioning positions to be corrected; for each of the positioning positions to be corrected, performing a center-of-gravity weighting processing on neighboring points for obtaining initial guess positions; and obtaining the initial guess positions to input to an optimizer and optimize an objective function, and finding corrected positions with relatively smallest errors. The objective function includes empirical weights associated with distance errors of the measured distances.

14 Claims, 11 Drawing Sheets

(51) Int. Cl.
*H04W 88/08* (2009.01)
*G01S 13/46* (2006.01)
*G01S 5/14* (2006.01)
*H04B 17/318* (2015.01)
*G01S 13/02* (2006.01)

(52) U.S. Cl.
CPC ............ *G01S 13/46* (2013.01); *H04B 17/318* (2015.01); *H04W 4/029* (2018.02); *H04W 88/08* (2013.01); *G01S 2013/468* (2013.01)

(58) Field of Classification Search
CPC .......... G01S 2013/468; G01S 5/02521; H04W 4/029; H04W 4/023; H04W 88/08; H04W 84/12; H04B 17/21; H04B 17/3912; H04B 17/27; H04B 17/318
See application file for complete search history.

(56) References Cited

U.S. PATENT DOCUMENTS

| | | | |
|---|---|---|---|
| 2018/0091939 A1* | 3/2018 | Venkatraman | H04W 4/021 |
| 2018/0288765 A1* | 10/2018 | Chrisikos | H04W 4/90 |
| 2020/0404448 A1* | 12/2020 | Park | G06Q 20/3224 |
| 2021/0049280 A1* | 2/2021 | Koshy | H04W 12/08 |

* cited by examiner

ULTRA-WIDEBAND ASSISTED PRECISE POSITIONING SYSTEM AND ULTRA-WIDEBAND ASSISTED PRECISE POSITIONING METHOD

CROSS-REFERENCE TO RELATED PATENT APPLICATION

This application claims the benefit of priority to Taiwan Patent Application No. 110118026, filed on May 19, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a positioning system and a positioning method, and more particularly to an ultra-wideband assisted precise positioning system and an ultra-wideband assisted precise positioning method.

BACKGROUND OF THE DISCLOSURE

The importance of spatial positioning has increased with the advancement of technology. Positioning information, whether indoor or outdoor, is heavily relied upon. Outdoor positioning requirements, such as driving, finding landmarks, route planning, and drone positioning, mainly rely on the global positioning system (GPS), and a positioning error thereof is about 5 to 10 meters. This accuracy is sufficient for most daily outdoor applications.

In recent years, demands for indoor positioning have increased, and various positioning signals and algorithms can be used to achieve different positioning accuracies according to different scenarios. Although the positioning technology has been extensively developed, a positioning method that uses a single signal for positioning has its limit in positioning accuracy, and improving said accuracy is difficult.

Therefore, with regard to a positioning limit of the single signal, how to use another positioning method as an aid for increasing the current positioning accuracy has become an important issue in the related art.

SUMMARY OF THE DISCLOSURE

In response to the above-referenced technical inadequacies, the present disclosure provides an ultra-wideband assisted precise positioning system and an ultra-wideband assisted precise positioning method for overcoming the issues in the related art.

In one aspect, the present disclosure provides an ultra-wideband assisted precise positioning system, which includes a plurality of device nodes and a central control device node. The plurality of device nodes each include a processing circuit, an ultra-wideband module, a positioning module, and a first communication module. The ultra-wideband module is configured to receive and send ultra-wideband signals. The positioning module is configured to generate positioning information. The central control device node is communicatively connected to the plurality of device nodes, and includes a second communication module, a storage unit and a central control processor. The second communication module is used for communicating with the plurality of device nodes. The storage unit is configured to store a positioning algorithm. The plurality of device nodes are configured to perform a positioning process including: for each of the plurality of device nodes, measuring distances to the other ones of the device nodes through the ultra-wideband module to obtain a plurality of measured distances; and for each of the device nodes, performing positioning through the positioning module to obtain a plurality of positioning positions to be corrected of the plurality of device nodes. The central control processor is configured to execute the positioning algorithm including: obtaining the plurality of measured distances and the plurality positioning positions to be corrected from the plurality of device nodes; and performing a center-of-gravity weighting processing on neighboring points for each of the plurality of positioning positions to be corrected, in which the center-of-gravity weighting processing on neighboring points includes: setting a current position to be corrected; finding two of the plurality of positioning positions closest to the current position to be corrected as two reference positions according to the plurality of measured distances; using the current position to be corrected and the two reference positions to form a reference triangle; and obtaining a center of gravity position of the reference triangle, and averaging the center of gravity position with the current position to be corrected to obtain an initial guess position of the current position to be corrected. The positioning algorithm also includes: obtaining multiple ones of the initial guess positions to input to an optimizer and optimize an objective function, and finding a plurality of corrected positions with relatively smallest errors, in which the objective function includes an empirical weight associated with a distance error of the measured distances; and using the plurality of corrected positions as a plurality of positioning results of the plurality of device nodes.

In another aspect, the present disclosure provides an ultra-wideband assisted precise positioning method, which includes: arranging a plurality of device nodes in a target area, in which each of the plurality of device nodes includes a processing circuit, an ultra-wideband module configured to receive and send ultra-wideband signals, a positioning module configured to generate positioning information, and a first communication module. The ultra-wideband assisted precise positioning method further includes: configuring a central control device node to communicatively connect to the plurality of device nodes. The central control device node includes a second communication module for communicating with the plurality of device nodes, a storage unit configured to store a positioning algorithm, and a central control processor. The ultra-wideband assisted precise positioning method further includes: configuring the plurality of device nodes to perform a positioning process, including: for each of the plurality of device nodes, measuring distances to the other device nodes through the ultra-wideband module to obtain a plurality of measured distances; and for each of the device nodes, performing positioning through the positioning module to obtain a plurality of positioning positions to be corrected of the plurality of device nodes. The ultra-wideband assisted precise positioning method further includes: configuring the central control processor to execute the positioning algorithm, including: obtaining the plurality of measured distances and the plurality positioning positions to be corrected from the plurality of device nodes; and performing a center-of-gravity weighting processing on neighboring points for each of the plurality of positioning positions to be corrected. The center-of-gravity weighting processing on neighboring points includes: setting a current position to be corrected; finding two of the plurality of positioning positions closest to the current position to be corrected according to the plurality of measured distances as two reference positions; using the current position to be corrected and the two reference positions as a reference triangle; and obtaining a center of gravity position of the reference triangle, and averaging the center of gravity position with the current position to be corrected to obtain an initial guess position of the current position to be corrected. The positioning algorithm further includes: obtaining a plurality of initial guess positions to input to an optimizer to optimize an objective function, and finding a plurality of corrected positions with relatively smallest errors, in which the objective function includes an empirical weight associated with a distance error of the measured distances; and using the plurality of corrected positions as a plurality of positioning results of the plurality of device nodes.

Therefore, in the ultra-wideband assisted precise positioning system and the ultra-wideband assisted precise positioning method provided by the present disclosure, a mesh network architecture is used to improve the positioning results through optimization of the objective function. After the optimization, a positioning accuracy can be improved by an order of magnitude.

In addition, in the ultra-wideband assisted precise positioning system and the ultra-wideband assisted precise positioning method provided by the present disclosure, by taking the center of gravity of the plurality of positioning results of each point and the neighboring two points, and averaging the center of gravity with the original positioning point for use as the initial guess position of each point, an optimization speed can be effectively improved. Further, a disadvantageous result of the optimization falling into a local minimum can be avoided, so as to enhance practicability of the ultra-wideband assisted precise positioning method provided by the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
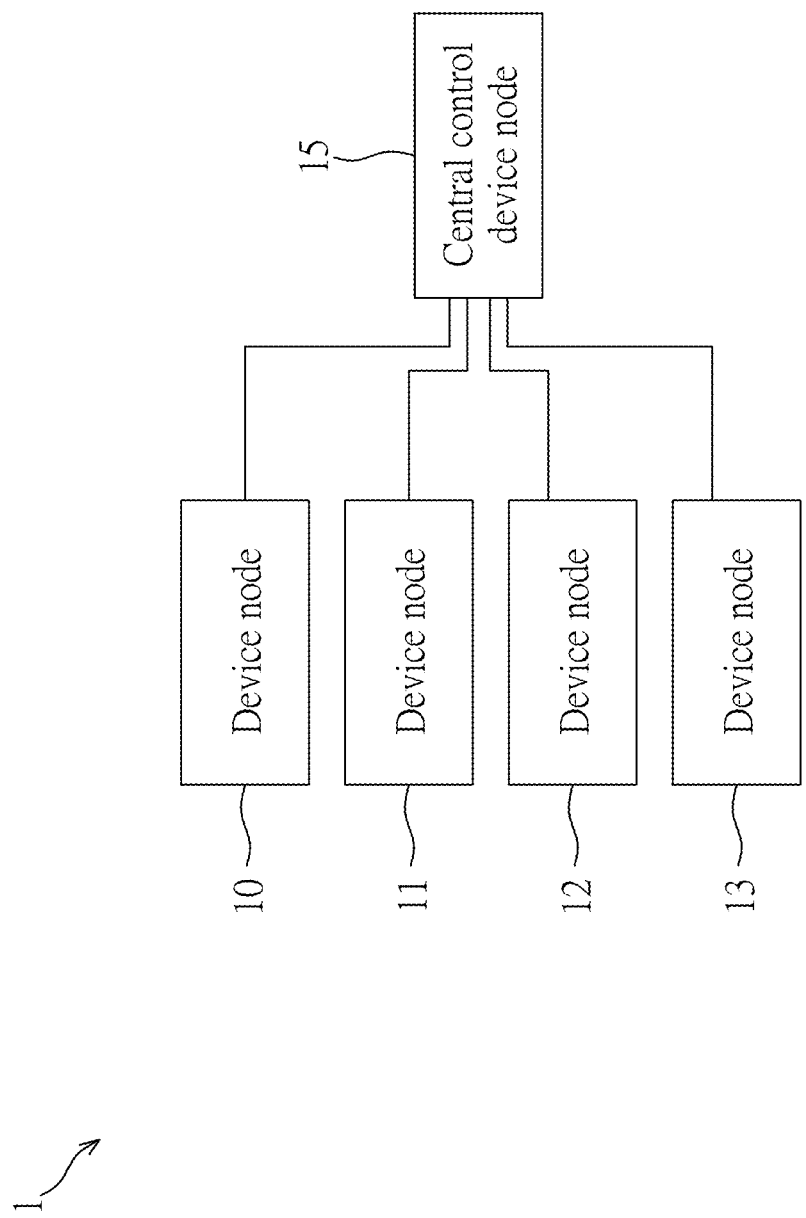
FIG. 1 is a block diagram of an ultra-wideband assisted precise positioning system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
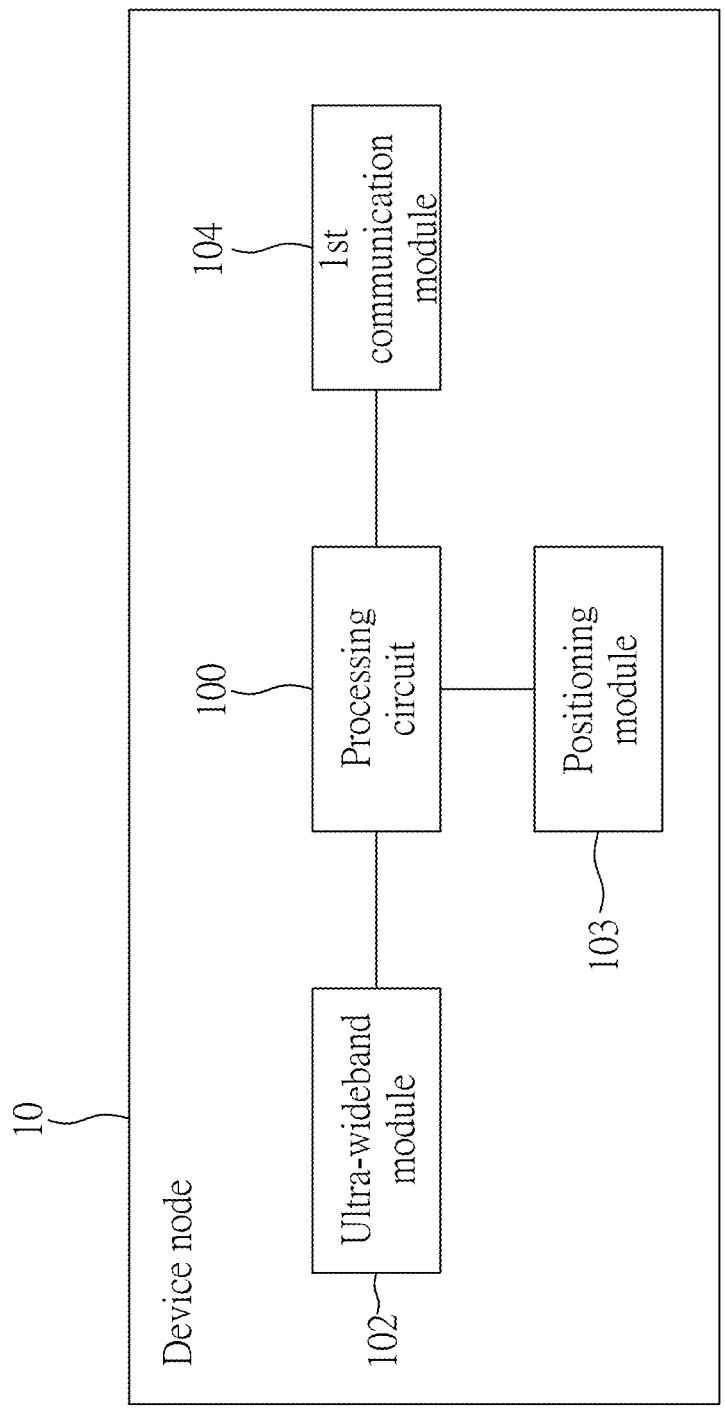
FIG. 2 is a block diagram of a device node according to one embodiment of the present disclosure.
Figure 3:
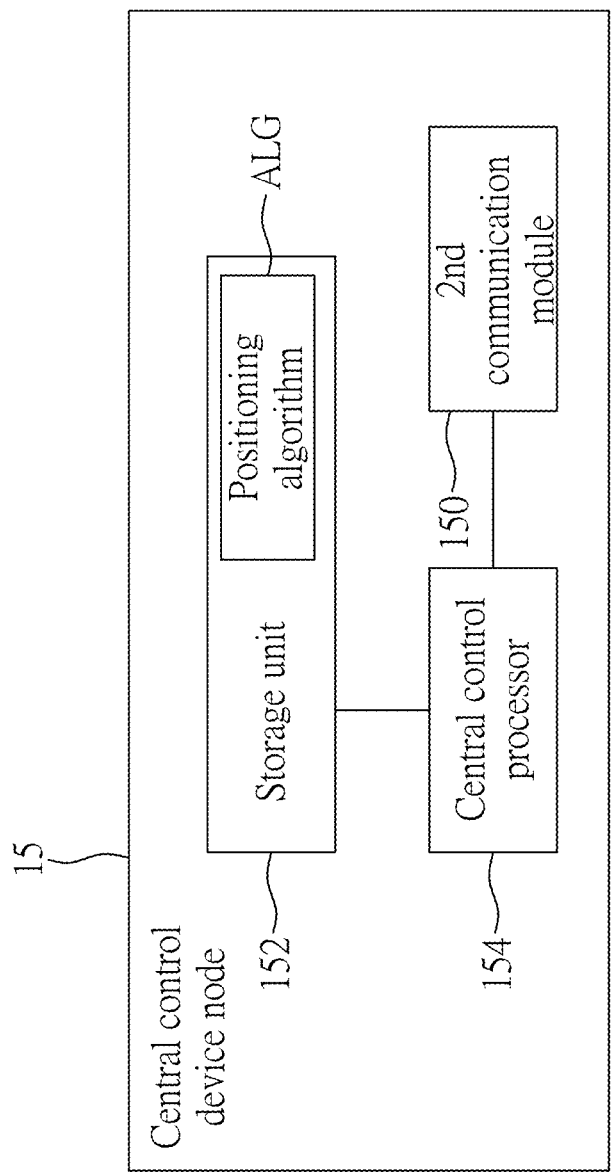
FIG. 3 is a block diagram of a central device node according to one embodiment of the present disclosure.

Reference is made to FIGS. 1 to 3, FIG. 1 is a block diagram of an ultra-wideband assisted precise positioning system according to an embodiment of the present disclosure, FIG. 2 is a block diagram of a device node according to an embodiment of the present disclosure, and FIG. 3 is a block diagram of a central control device node according to an embodiment of the present disclosure. As shown in FIGS. 1 to 3, an embodiment of the present disclosure provides an ultra-wideband assisted precision positioning system 1, which includes a plurality of device nodes 10, 11, 12, 13 and a central control device node 15.

In the present disclosure, the plurality of device nodes are mainly used as nodes to form a mesh-like network environment, and additional distance information is used between the plurality of nodes to optimize a positioning accuracy. The device nodes 10, 11, 12, and 13 basically have the same configuration. Taking the device node 10 as an example, the device node 10 includes a processing circuit 100, an ultra-wideband module 102, a positioning module 103, and a first communication module 104. The device node 10 can be, for example, a smart mobile device equipped with the ultra-wideband module 102 and the positioning module 103, but the present disclosure is not limited thereto.

In this embodiment, a number of the plurality of device nodes needs to be at least 4. Specifically, when there are 4 device nodes and distances between the 4 device nodes are known, a total of 6 unknowns, 6 knowns (6 distances), and 6 equations need to be obtained during a computation process. The more redundancy is provided, the greater an optimization effect that can be obtained. It should be noted that when the number of the plurality of device nodes is less than 4, known conditions are not sufficient to optimize the unknowns. Therefore, the number of the plurality of device nodes needs to be at least 4 to effectively achieve the optimization effect.

The ultra-wideband module 102 is configured to receive and transmit ultra-wideband signals to communicate with the ultra-wideband module of another device node, so as to obtain distance information. Ultra-wideband (UWB) is a wireless personal area network communication technology with low power consumption and high-speed transmission, and is suitable for wireless communication applications requiring high-quality services. UWB can be used in fields such as wireless personal area networks (WPAN), home network connection and short-range radar, and UWB uses pulse signals to receive and transmit ultra-wideband signals.

The positioning module 103 is configured to generate positioning information. The positioning module 103 can be, for example, a global satellite positioning system module or a WI-FI positioning system module.

The first communication module 104 can be, for example, a wireless communication module that supports various short-range or long-distance communications (such as a wireless communication module that supports WI-FI, BLUETOOTH, and other specifications). The first communication module 104 can also be a wired communication module, such as a network card supporting an Ethernet interface.

The processing circuit 100 can be, for example, a central processing unit (CPU), or can be a programmable general-purpose or special-purpose microprocessor, a digital signal processor (DSP), a programmable controller, an application specific integrated circuit (ASIC), a programmable logic device (PLD), a graphics processing unit (GPU), or other similar devices or a combination thereof.

As shown in FIGS. 1 and 3, the central control device node 15 is communicatively connected to the device nodes 10, 11, 12, and 13, and includes a second communication module 150, a storage unit 152 and a central control processor 154.

The second communication module 150 is used to communicate with the plurality of device nodes, for example, to communicate with the first communication module 104. Similarly, the second communication module 150 can also be, for example, a wireless communication module that supports various short-range or long-distance communications (such as a wireless communication module that supports WI-FI, BLUETOOTH, and other specifications). The second communication module 150 can also be a wired communication module, such as a network card supporting an Ethernet interface.

The storage unit 152 can be used to store data (such as images, program codes, software modules, and the like), and can be, for example, any type of fixed or removable random access memory (RAM), read-only memory (ROM), flash memory, hard disk or other similar devices, integrated circuits and combinations thereof. In this embodiment, the storage unit 152 is used to store a positioning algorithm ALG, and details of the positioning algorithm ALG will be described below.

The central control processor 154 can also be, for example, a CPU, or can be a programmable general-purpose or special-purpose microprocessor, a DSP, a programmable controller, an ASIC, a PLD, a GPU or other similar devices or combinations thereof. The central control processor 154 can be used to execute the aforementioned positioning algorithm ALG.

Figure 4:
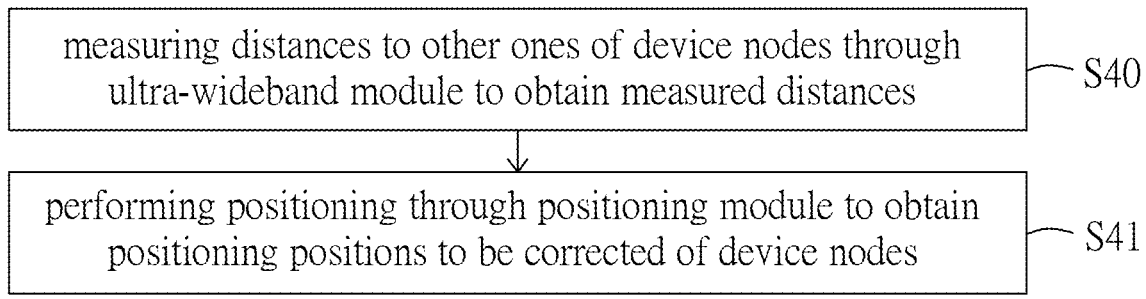
FIG. 4 is a flowchart of a positioning process according to one embodiment of the present disclosure.

The plurality of device nodes can be used as a plurality of nodes to execute a positioning process provided in the embodiment of the present disclosure. Reference is made to FIG. 4, which is a flowchart of a positioning process according to an embodiment of the present disclosure. The positioning process includes executing the following steps for each of the device nodes (taking the device node 10 as an example):

Step S40: measuring distances to other ones of the device nodes through the ultra-wideband module to obtain a plurality of measured distances.

Step S41: performing positioning through the positioning module to obtain a plurality of positioning positions to be corrected of the plurality of device nodes.

Figure 5:
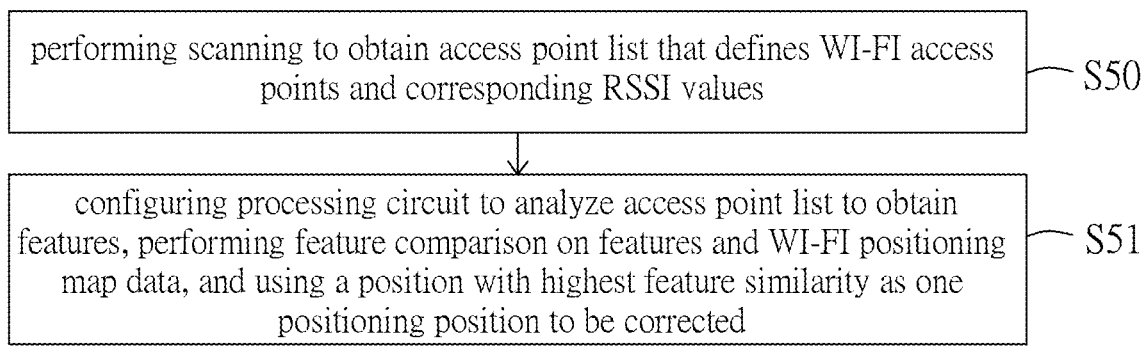
FIG. 5 is a flowchart of the positioning process according to one embodiment of the present disclosure in further detail.

Reference is made to FIG. 5, which is a detailed flowchart of the positioning process according to an embodiment of the present disclosure. For example, when the positioning module is a WI-FI positioning system module, configuration of the positioning module can be included in step S41 to perform the following steps:

Step S50: performing scanning to obtain an access point list, which defines a plurality of WI-FI access points and corresponding received signal strength indication (RSSI) values.

Step S51: configuring the processing circuit to analyze the access point list to obtain a plurality of features, performing a feature comparison on the plurality of features and WI-FI positioning map data, and using a position with the highest feature similarity as one positioning position to be corrected.

For example, in step S51, scene analysis methods can be used to mainly compare a plurality of features of signals collected in an environment with the WI-FI positioning map data, and a point with similar features is selected as a position of an object to be measured. Out of various scene analysis methods, a fingerprint positioning method is often used. Since the fingerprint positioning method determines the position of the object to be measured through comparison of features, collecting enough reference points in a field to be positioned is necessary. All WI-FI signals that can be received are collected for each of the reference points, received data is stored in a database, and an obtained signal collected at a position to be positioned is regarded as an input of the positioning algorithm. Finally, an output is obtained by executing the positioning algorithm, which is a positioning result.

The positioning algorithm can utilize, for example, a deterministic approach, a probabilistic approach, and an image recognition technique. The deterministic approach is mainly used to determine a similarity of data features, and is utilized to perform a comparison so as to obtain a similarity between received signal strengths (RSS) measured in real time and each fingerprint in the database. If WI-FI signals obtained at each of the reference points are taken as a vector set, and the measured RSS are also taken as a vector set, the deterministic approach is to compare a distance between two RSS vector sets in a signal domain. The higher the similarity is, the shorter the distance must be. Therefore, the object to be positioned will finally be positioned on the reference point with the shortest distance in the signal domain.

For further explanation, a common algorithm can be, for example, a k-nearest neighbors algorithm (KNN). There are two variable parameters in a KNN model: K, and a definition of distance. K refers to K similar reference points that are selected, and a geometric average of the selected reference points is taken as a predicted position of the object to be positioned.

In addition, the positioning map data can be completed by collecting WI-FI signals in a target field. Before collection, performing a simultaneous localization and mapping (SLAM) in the target field is necessary. An entire map can be scanned by an optical radar, and data of this positioning is used as a reference. Positions of a plurality of collection points are set according to the map of the above-mentioned target field, and WI-FI RSS at the plurality of collection points are collected to establish the positioning map data.

After the positioning process is performed for every device node to obtain the plurality of measured distances and the plurality of positioning positions to be corrected, the central control processor can be configured to execute a positioning algorithm to correct the plurality of positioning positions to be corrected. In detail, since the positioning result of each device node is independent, and probability models of positioning and ranging are all normal distributions, after a geometric analysis is performed, spatial geometric relationships between the plurality of device nodes can be obtained (that is, relative spatial positions of the plurality of device nodes). However, absolute positions of the plurality of device nodes are still unknown. Therefore, another positioning method is required to provide positioning positions of the plurality of nodes (that is, the WI-FI positioning method utilized in steps S50 and S51), and then the positioning positions are calibrated by the distances.

An objective function can be expressed by the following equation (1):

$$\alpha \sum\nolimits_{\substack{k,j=0 \\ i<j}}^{N-1} (|\vec{r_i} - \vec{r_j}|\widetilde{D_{ij}})^2 + \sum\nolimits_{k=0}^{N-1} |\vec{r_i} - \tilde{r_i}|^2; \quad \text{equation (1)}$$

where N is a total number of the plurality of device nodes, $\vec{r_i}$ is an optimized positioning position, $\tilde{r_i}$ is a positioning position to be corrected, and $\widetilde{D_{ij}}$ is a measured distance between two of the plurality of device nodes. In equation (1), there are two signal components from different sources. A first term is an error term of a measured distance between two of the device nodes after the optimization is performed (that is referred to as a distance error), and a second term is a position error term of the positioning method after the optimization is performed. In other words, the objective function includes a distance error and a position error. The distance error is an error between a plurality of relative distances and the plurality of measured distances, in which the plurality of relative distances are between the plurality of corrected positions. The position error is an error between the plurality of corrected positions and the plurality of positions to be corrected.

In addition, since measurement errors on hardware also need be taken into consideration in the plurality of measured distances, the plurality of device nodes can be configured to perform a calibration process, which includes measuring distances between the plurality of device nodes through the ultra-wideband modules to generate a plurality of distance equations. Each of the plurality of distance equations includes a plurality of hardware errors of the plurality of device nodes. The calibration process further includes obtaining the plurality of hardware errors by solving the plurality of distance equations.

Assuming that the hardware errors of the device nodes 10, 11, 12, and 13 are $e_i$, i=0-3, the measured distances between the device nodes 10, 11, 12, and 13 is $D_{ij} = \overline{D}_{ij} + e_i + e_j$, where $\overline{D}_{ij}$ is true distances. Therefore, using six distance equations representing the distances between the device nodes 10, 11, 12, and 13, four unknown hardware errors of the device nodes 10, 11, 12, and 13 can be obtained. The calculation is based on the following equation (2):

$$A \vec{x} = \vec{b}, \text{ where}$$

$$A = \begin{bmatrix} 1 & 1 & 0 & 0 \\ 1 & 0 & 1 & 0 \\ 1 & 0 & 0 & 1 \\ 0 & 1 & 1 & 0 \\ 0 & 1 & 0 & 1 \\ 0 & 0 & 1 & 1 \end{bmatrix}_{6\times 4}, \vec{x} = \begin{bmatrix} e_0 \\ e_1 \\ e_2 \\ e_3 \end{bmatrix}_{4\times 1}, \vec{b} = \begin{bmatrix} D_{01} - \overline{D}_{01} \\ D_{02} - \overline{D}_{02} \\ D_{03} - \overline{D}_{03} \\ D_{12} - \overline{D}_{12} \\ D_{13} - \overline{D}_{13} \\ D_{23} - \overline{D}_{23} \end{bmatrix}_{6\times 1} \quad \text{equation (2)}$$

Therefore, using $\vec{x} = (A^T A)^{-1} A^T \vec{b}$ and the least square method, the hardware errors can be calculated.

In terms of accuracy, errors of the distance measurement method will be smaller than the position errors of the positioning method. Therefore, the objective function further includes an empirical weight α associated with the distance error of the measured distances, and the empirical weight α is multiplied by the distance error to adjust the weight. Since the positioning algorithm ALG is performed based on the above objective function, the empirical weight α to be used needs to be estimated first.

Figure 6:
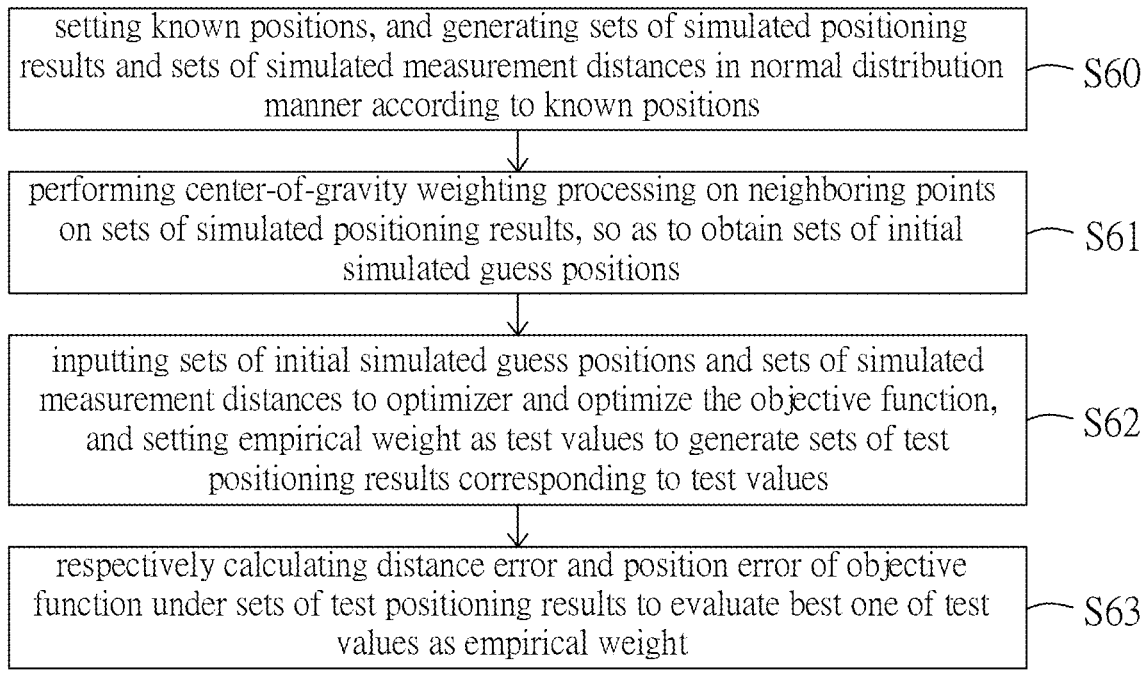
FIG. 6 is a flowchart of an optimization process according to one embodiment of the present disclosure.

The empirical weight α can be obtained by pre-configuring the plurality of device nodes and the central control device node to perform an optimization process. Reference is made to FIG. 6, which is a flowchart of an optimization process according to an embodiment of the present disclosure. As shown in FIG. 6, the optimization process includes the following steps:

Step S60: setting a plurality of known positions, and generating a plurality of sets of simulated positioning results and a plurality of sets of simulated measurement distances in a normal distribution manner according to the plurality of known positions.

Figure 7:
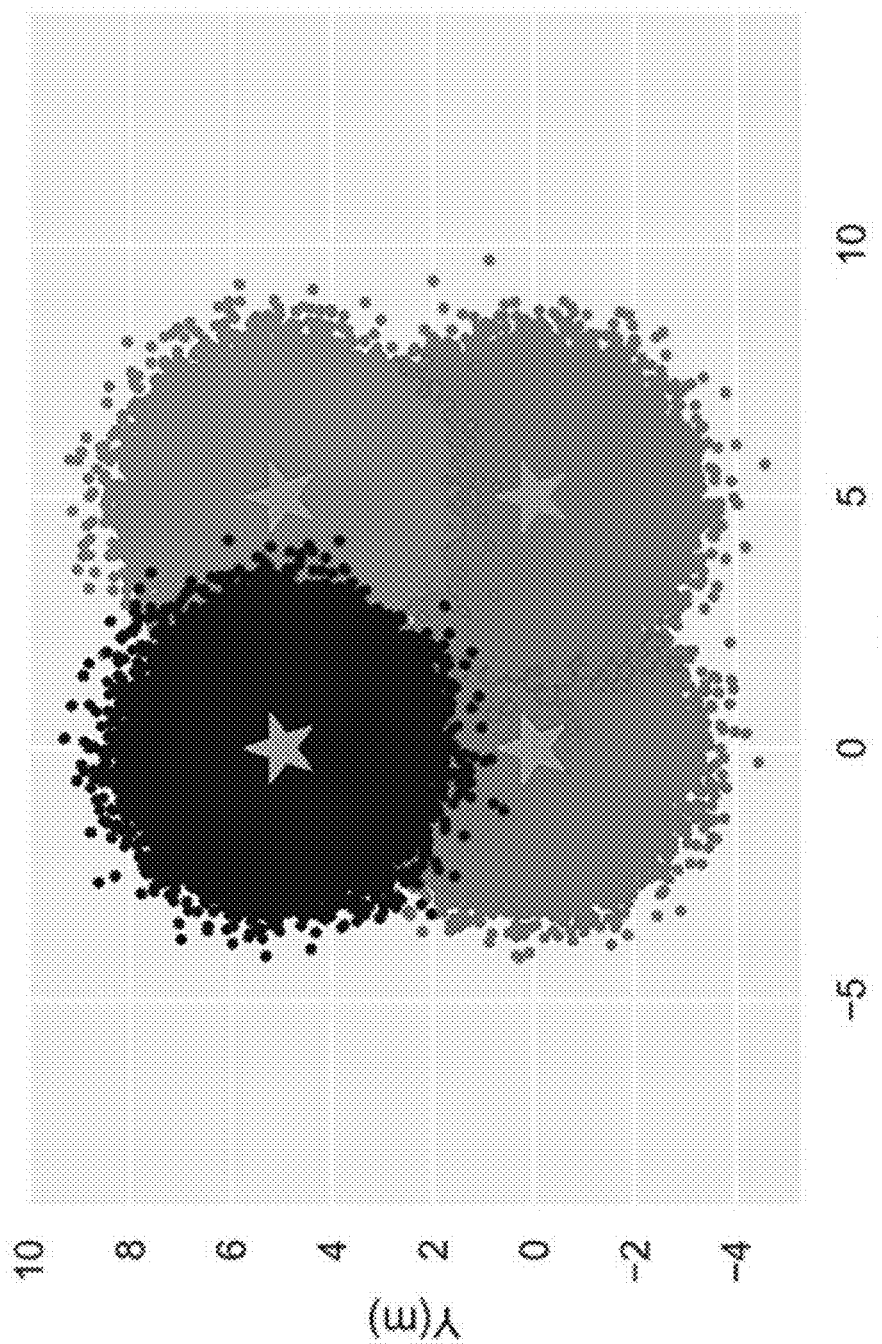
FIG. 7 is a simulated WI-FI positioning distribution diagram according to one embodiment of the present disclosure.

First, reference is made to FIG. 7, which is a simulated WI-FI positioning distribution diagram according to an embodiment of the present disclosure. As shown in FIG. 7, ground truth positions of the four device nodes are determined to be (0, 0), (5, 0), (5, 5), (0, 5), and 1000 records of WI-FI positioning positions are simulated for each of the device nodes (that is, dots shown in FIG. 7, each of which represents the positioning data of different device nodes). The x and y coordinates of each device node in FIG. 7 are simulated with normal distribution. The distances between the device nodes can be calculated from the ground truth positions of the device nodes, and simulated measurement distances can be generated through these distances to complete the data for the optimization process.

Step S61: performing a center-of-gravity weighting processing on neighboring points on the plurality of sets of simulated positioning results, so as to obtain a plurality of sets of initial simulated guess positions.

In detail, it is necessary to consider an influence of selecting an initial value for parameters in the objective function. The objective function includes initial guess positions of the device nodes before optimization. However, wrong initial guess positions may result in transposes between the device nodes (or referred to as "misplacement"), thereby causing the optimized positions to be far from the ground truth positions.

Figure 8:
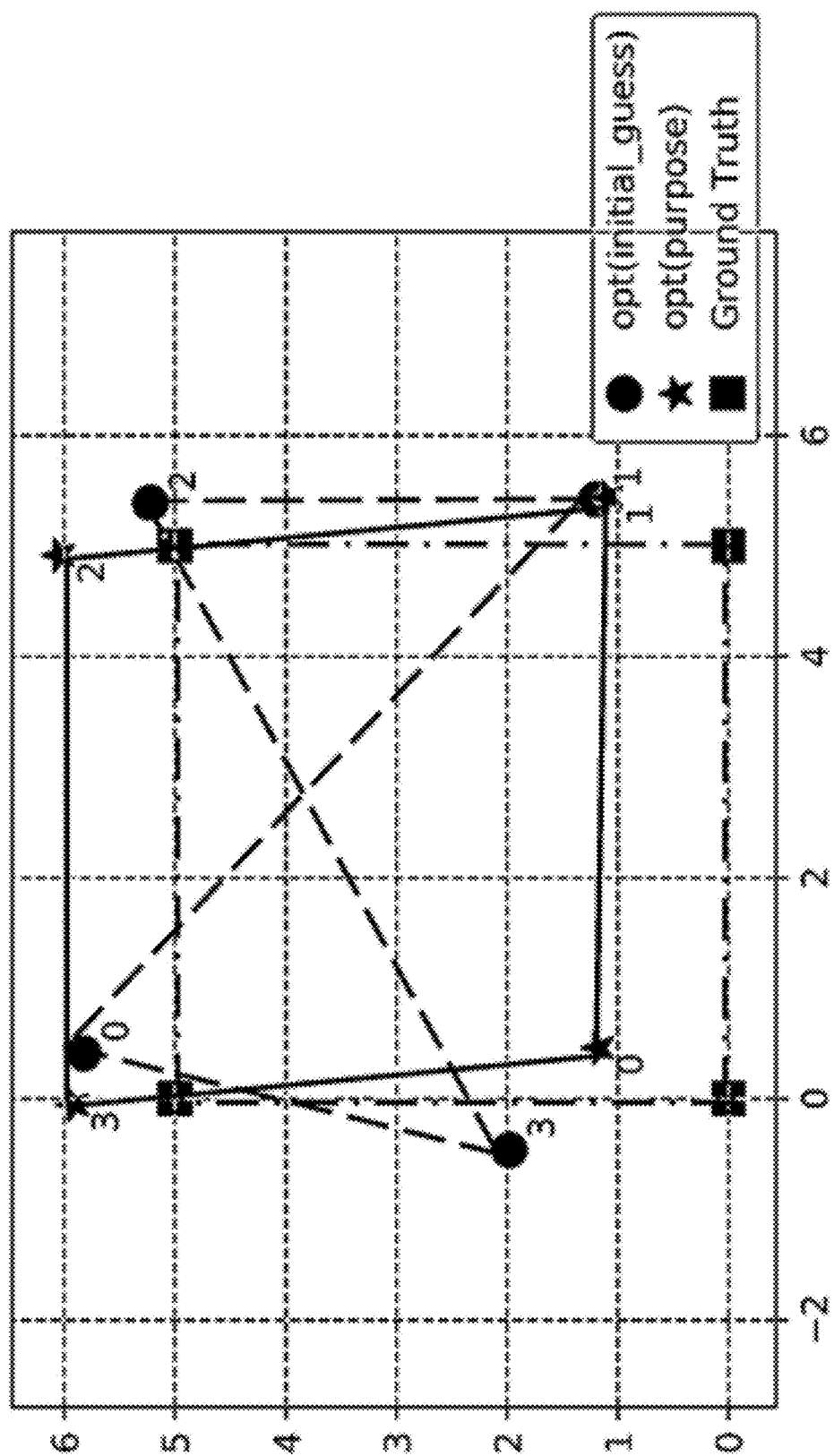
FIG. 8 is a comparison diagram of initial guess position settings according to one embodiment of the present disclosure.

Reference is made to FIG. 8, which is a comparison diagram of initial guess position settings according to an embodiment of the present disclosure. A first method is an initial value selection method. The positioning results and a center of gravity of the initial positioning results of the device nodes are weighted as an initial position, as shown by circles in FIG. 8 (marked as opt(initial_guess)). However, such a setting method will cause the previously misplaced device nodes to remain in a misplaced state, since this position adjustment only adjusts positions on a connection line between the positioning point and the center of gravity, so that the misplacements are difficult to correct.

Figure 9:
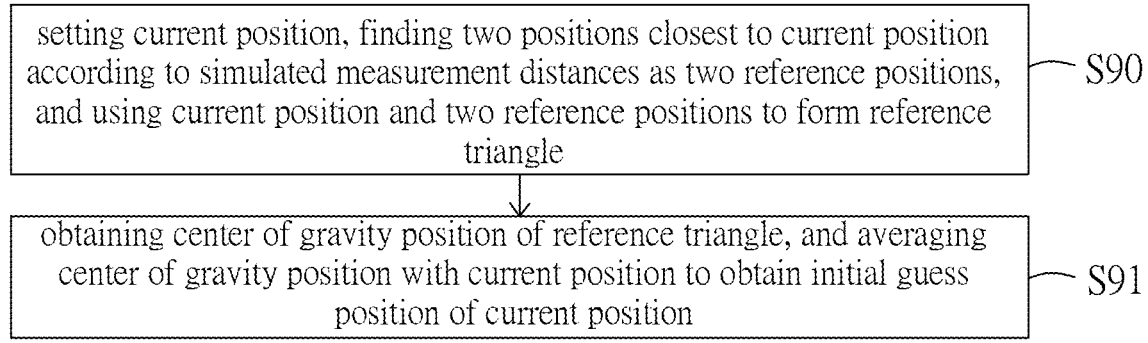
FIG. 9 is a flowchart of a center-of-gravity weighting processing on neighboring points according to the present disclosure.

Given this, the present disclosure further provides a way to correct the above-mentioned misplacements, which is referred to as a center-of-gravity weighting processing on neighboring points. Reference is made to FIG. 9, which is a flowchart of a center-of-gravity weighting processing on neighboring points according to the present disclosure. As shown in FIG. 9, in the center-of-gravity weighting processing on neighboring points, the following steps are performed on each of the plurality of device nodes.

Step S90: setting a current position, finding two positions closest to the current position according to the simulated measurement distances as two reference positions, and using the current position and the two reference positions to form a reference triangle.

Step S91: obtaining a center of gravity position of the reference triangle, and averaging the center of gravity position with the current position to obtain an initial guess position of the current position.

As shown in star-shaped marks (marked as opt (purpose)) in FIG. 8, this method can pull the misplacements by the neighboring points, and then pull the misplacements through the original positioning point in the last step, so as to effectively solve the above-mentioned misplacement problem such that the initial guess positions of all the device nodes are no longer misplaced. To more clearly show whether the position is misplaced, the initial positions selected by the above methods in FIG. 8 are connected in sequence from number 0 to number 3. Square marks are the ground truth positions (marked as Ground Truth), and it can be observed that the connection is a quadrilateral. However, the connection of the circular marks shows that the number 0 and the number 3 are obviously misplaced, and the connection of the star marks forms a quadrilateral, which indicates that these four points are not misplaced. Therefore, by using the center-of-gravity weighting processing on neighboring points, the misplacements of the initial positions can be effectively avoided.

Step S62: inputting the plurality of sets of initial simulated guess positions and the plurality of sets of simulated measurement distances to the optimizer and optimize the objective function, and setting the empirical weight as a plurality of test values to generate a plurality of sets of test positioning results corresponding to the plurality of test values. For example, the objective function can be optimized by an optimizer in TensorFlow package, so as to obtain an optimized position. The optimizer can be, for example, a gradient descent method. After all the data is obtained, the next step is to input the data to the objective function of equation (1) to optimize the coordinates. Since there are 4 device nodes, N is 4.

Step S63: respectively calculating the distance error and the position error of the objective function under the plurality of sets of test positioning results to evaluate a best one of the plurality test values as the empirical weight.

Figure 10:
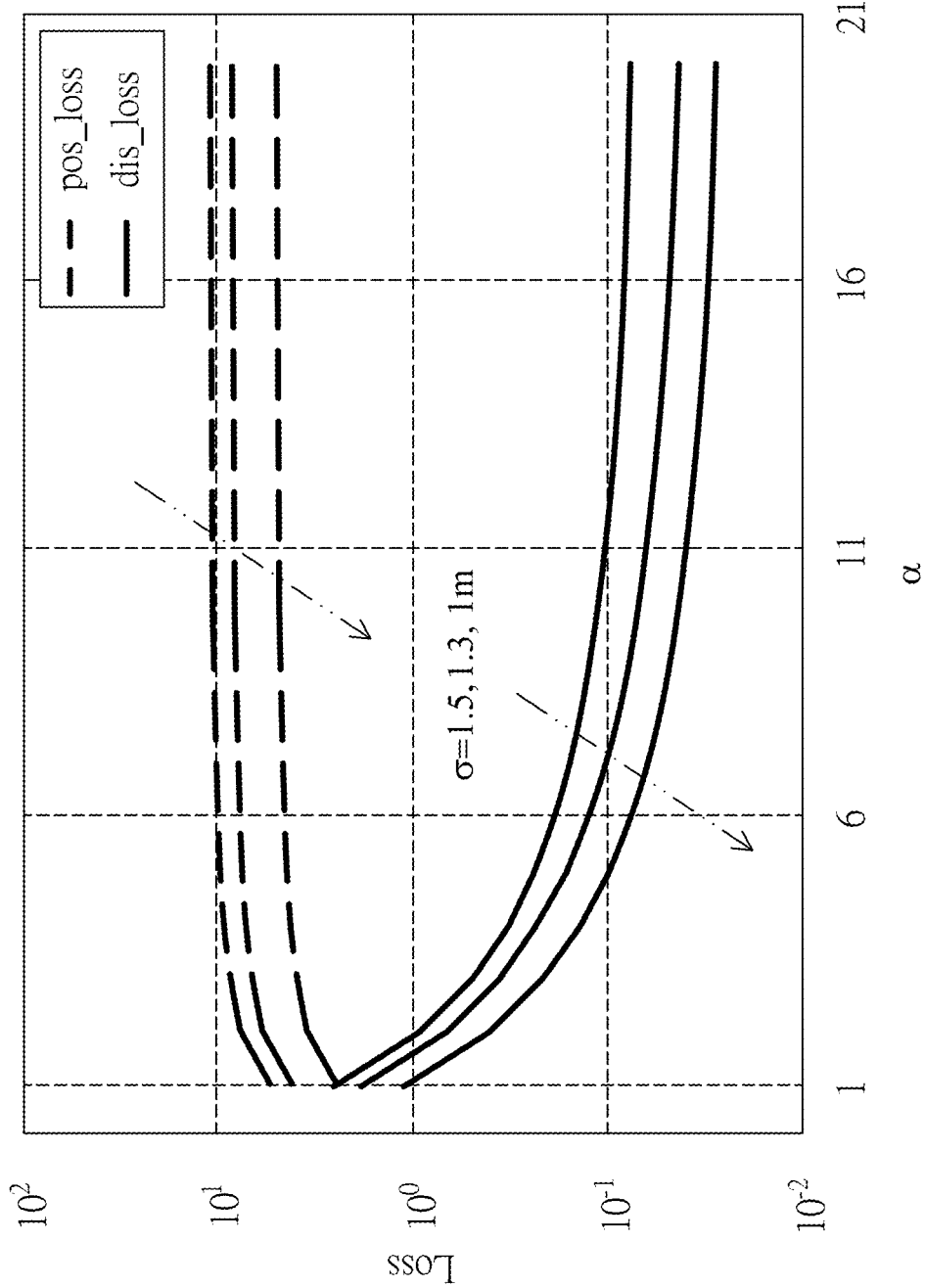
FIG. 10 is a graph illustrating different empirical weights α versus errors according to one embodiment of the present disclosure.

During the optimization process, relationships between the final corrected position errors and the different empirical weights a are examined first. Reference can be made to FIG. 10, which is a graph illustrating different empirical weights $\alpha$ versus errors according to an embodiment of the present disclosure. It can be observed that as the empirical weight $\alpha$ increases, the distance error (labeled as dis loss) decreases, and the position error (labeled as pos_loss) increases. In this objective function, a first term is a difference between the relative distance of each device node after the optimization is performed and the measured distance. The smaller the first term is, the closer the relative distance to the measured distance is. However, since a standard deviation $\sigma$ of the measured distances is 0.15 m, a minimum of the distance error will be close to 0.135 m (which is close to the error of the measured distance). At this time, the empirical weight $\alpha$ is 6.6. It can be observed from FIG. 10 that when $\alpha$ is increased again, the improvement of the distance error is of little significance. On the contrary, the position error will increase, which is not a good choice. Based on the foregoing calculations, choosing 6.6 as the empirical weight $\alpha$ is the best choice.

Figure 11:
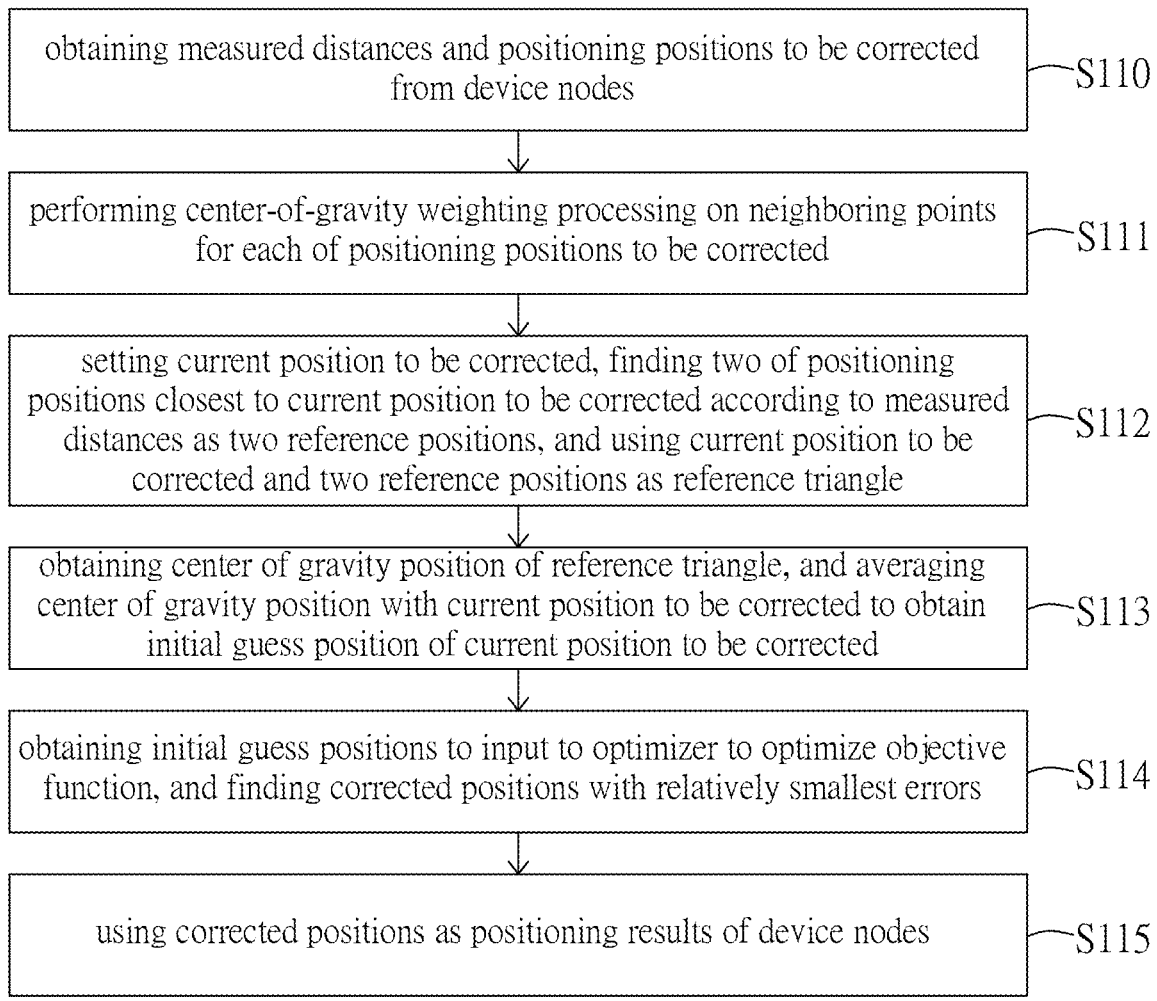
FIG. 11 is a flowchart of a positioning algorithm according to one embodiment of the present disclosure.

Reference is made to FIG. 11, which is a flowchart of a positioning algorithm according to an embodiment of the present disclosure. After determining the empirical weight $\alpha$, the central control device node can be further configured to execute the positioning algorithm ALG, which includes the following steps:

Step S110: obtaining the plurality of measured distances and the plurality positioning positions to be corrected from the plurality of device nodes.

Step S111: performing a center-of-gravity weighting processing on neighboring points for each of the plurality of positioning positions to be corrected. The details of the center-of-gravity weighting processing on neighboring points have been described above, so only the corresponding steps are described herein, and repeated descriptions will be omitted.

Step S112: setting a current position to be corrected, finding two of the plurality of positioning positions closest to the current position to be corrected according to the plurality of measured distances as two reference positions, and using the current position to be corrected and the two reference positions as a reference triangle.

Step S113: obtaining a center of gravity position of the reference triangle, and averaging the center of gravity position with the current position to be corrected to obtain an initial guess position of the current position to be corrected.

Step S114: obtaining a plurality of initial guess positions to input to an optimizer to optimize an objective function, and finding a plurality of corrected positions with relatively smallest errors.

Step S115: using the plurality of corrected positions as a plurality of positioning results of the plurality of device nodes.

Figure 12A:
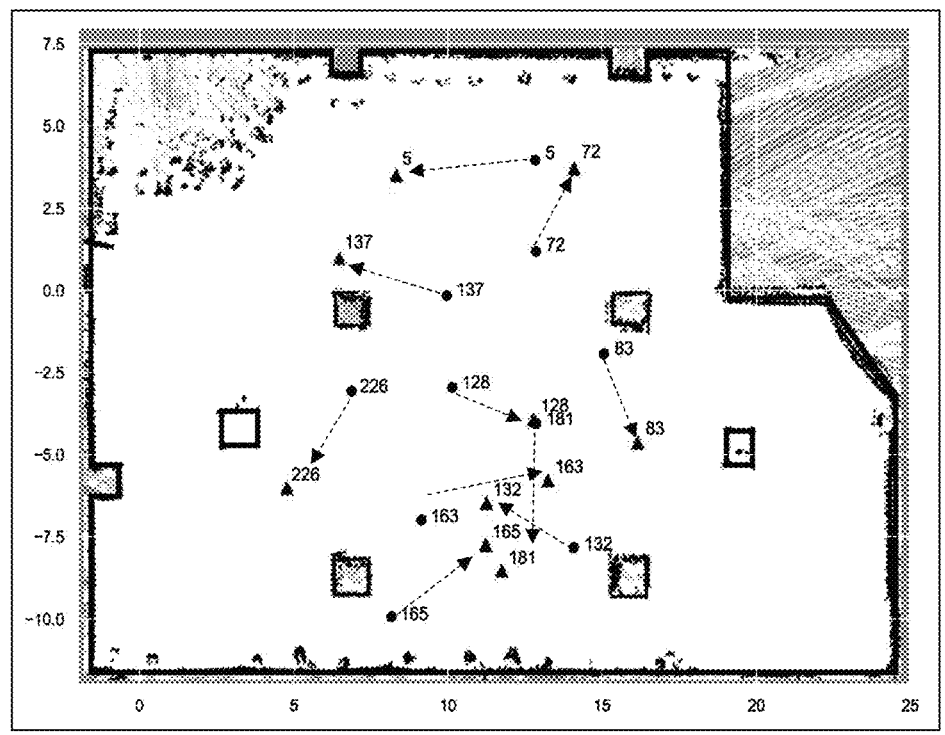
FIGS. 12A and 12B are respectively position distribution diagrams before and after performance of an optimization according to an embodiment of the present disclosure.
Figure 12B:
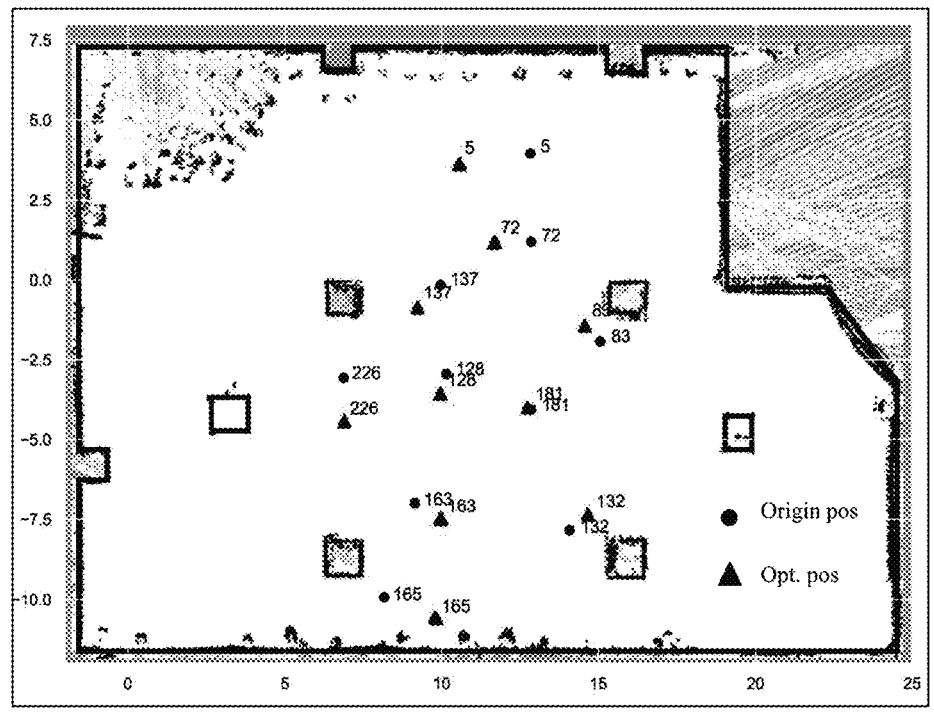

Further reference can be made to FIGS. 12A and 12B, which are respectively position distribution diagrams before and after an optimization being performed according to an embodiment of the present disclosure.

As shown in FIG. 12A, 10 points in the target field are selected as examples for experimentation. In a spatial distribution diagram of these 10 points, dots are ground truth positions, triangles are positioning positions to be corrected that are generated after the WI-FI positioning module performs positioning, and dashed arrows are auxiliary lines for showing that the positioning results of the WI-FI positioning module have a certain degree of error and are separated from the ground truth positions.

As shown in FIG. 12B, dots are the positioning positions to be corrected (labeled as Origin pos), and triangles are the corrected position (labeled as Opt. pos). Compared with FIG. 12A, it can be observed that the optimization method provided by the present disclosure can greatly improve the positioning results, which are quantified as shown in Table 1. Before the correction, an average error of these 10 points is 3.61 m, and the error is 4.53 m at 90%. After the correction, the average error of these 10 points is 1.09 m, and the error is 1.86 m at 90%. It can be observed from the data that the positioning results are greatly improved, and the positioning error is improved by about 70%.

TABLE 1

| Positioning error (m) | Average error | 90% error |
| --- | --- | --- |
| Original | 3.61 | 4.53 |
| After correction | 1.09 | 1.86 |

In conclusion, in the ultra-wideband assisted precise positioning system and the ultra-wideband assisted precise positioning method provided by the present disclosure, a mesh network architecture is used to improve the positioning results through optimization of the objective function. After the optimization, a positioning accuracy can be improved by an order of magnitude.

In addition, in the ultra-wideband assisted precise positioning system and the ultra-wideband assisted precise positioning method provided by the present disclosure, by taking the center of gravity of the plurality of positioning results of each point and the neighboring two points, and averaging the center of gravity with the original positioning point for use as the initial guess position of each point, an optimization speed can be effectively improved. Further, a disadvantageous result of the optimization falling into a local minimum can be avoided, so as to enhance practicability of the ultra-wideband assisted precise positioning method provided by the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An ultra-wideband assisted precise positioning system, comprising:
    a plurality of device nodes, each including:
        a processing circuit;
        an ultra-wideband module configured to receive and send ultra-wideband signals;
        a positioning module configured to generate positioning information; and
        a first communication module; and
    a central control device node communicatively connected to the plurality of device nodes, and including:
        a second communication module for communicating with the plurality of device nodes;
        a storage unit configured to store a positioning algorithm; and
        a central control processor;
    wherein the plurality of device nodes are configured to perform a positioning process, the positioning process including:
        for each of the plurality of device nodes, measuring distances to other ones of the device nodes through the ultra-wideband module to obtain a plurality of measured distances; and
        for each of the device nodes, performing positioning through the positioning module to obtain a plurality of positioning positions to be corrected of the plurality of device nodes;
    wherein the central control processor is configured to execute the positioning algorithm, the positioning algorithm including:
        obtaining the plurality of measured distances and the plurality positioning positions to be corrected from the plurality of device nodes;
        performing a center-of-gravity weighting processing on neighboring points for each of the plurality of positioning positions to be corrected, wherein the center-of-gravity weighting processing on neighboring points includes:
            setting a current position to be corrected;
            finding two of the plurality of positioning positions closest to the current position to be corrected as two reference positions according to the plurality of measured distances;
            using the current position to be corrected and the two reference positions to form a reference triangle; and
            obtaining a center of gravity position of the reference triangle, and averaging the center of gravity position with the current position to be corrected to obtain an initial guess position of the current position to be corrected;
        obtaining multiple ones of the initial guess position to input to an optimizer and optimize an objective function, and finding a plurality of corrected positions with relatively smallest errors, wherein the objective function includes an empirical weight associated with a distance error of the measured distances; and using the plurality of corrected positions as a plurality of positioning results of the plurality of device nodes.

2. The ultra-wideband assisted precise positioning system according to claim 1, wherein the positioning module is a global satellite positioning system module.

3. The ultra-wideband assisted precise positioning system according to claim 1, wherein the positioning module is a WI-FI positioning system module, and the positioning module is further configured to:
perform scanning to obtain an access point list that defines a plurality of WI-FI access points and corresponding received signal strength indication (RSSI) values; and
configure the processing circuit to analyze the access point list to obtain a plurality of features, perform a feature comparison on the plurality of features and WI-FI positioning map data, and use a position with a highest feature similarity as the position to be corrected.

4. The ultra-wideband assisted precise positioning system according to claim 1, wherein a number of the plurality of device nodes is four or more.

5. The ultra-wideband assisted precise positioning system according to claim 1, wherein the plurality of device nodes are further configured to perform a calibration procedure, the calibration procedure including:
measuring distances between the plurality of device nodes through the ultra-wideband module to generate a plurality of distance equations, wherein each of the plurality of distance equations includes a plurality of hardware errors of the plurality of device nodes; and
obtaining the plurality of hardware errors by solving the plurality of distance equations.

6. The ultra-wideband assisted precise positioning system according to claim 1, wherein the objective function includes the plurality of distance errors and a position error, the plurality of distance errors are errors between a plurality of relative distances of the plurality of corrected positions and the plurality of measured distances, and the position error is an error between the plurality of corrected positions and the plurality of positioning positions to be corrected.

7. The ultra-wideband assisted precise positioning system according to claim 6, wherein the empirical weight is obtained by configuring the plurality of device nodes and the central control device node to perform an optimization process, and the optimization process includes:
setting a plurality of known positions, and generating a plurality of sets of simulated positioning results and a plurality of sets of simulated measurement distances in a normal distribution manner according to the plurality of known positions;
performing the center-of-gravity weighting processing on neighboring points on the plurality of sets of simulated positioning results to obtain a plurality of sets of initial simulated guess positions;
inputting the plurality of sets of initial simulated guess positions and the plurality of sets of simulated measurement distances to the optimizer to optimize the objective function, and setting the empirical weight as a plurality of test values to generate a plurality of sets of test positioning results corresponding to the plurality of test values; and
respectively calculating the distance error and the position error of the objective function under the plurality of sets of test positioning results to determine a best one of the plurality test values as the empirical weight.

8. An ultra-wideband assisted precise positioning method, comprising:
arranging a plurality of device nodes in a target area, wherein each of the plurality of device nodes includes:
a processing circuit;
an ultra-wideband module configured to receive and send ultra-wideband signals;
a positioning module configured to generate positioning information; and
a first communication module;
configuring a central control device node to communicatively connect to the plurality of device nodes, wherein the central control device node includes:
a second communication module for communicating with the plurality of device nodes;
a storage unit configured to store a positioning algorithm; and
a central control processor;
configuring the plurality of device nodes to perform a positioning process, the positioning process including:
for each of the plurality of device nodes, measuring distances to other ones of the device nodes through the ultra-wideband module to obtain a plurality of measured distances; and
for each of the device nodes, performing positioning through the positioning module to obtain a plurality of positioning positions to be corrected of the plurality of device nodes; and
configuring the central control processor to execute the positioning algorithm, the positioning algorithm including:
obtaining the plurality of measured distances and the plurality positioning positions to be corrected from the plurality of device nodes;
performing a center-of-gravity weighting processing on neighboring points for each of the plurality of positioning positions to be corrected, wherein the center-of-gravity weighting processing on neighboring points includes:
setting a current position to be corrected;
finding two of the plurality of positioning positions closest to the current position to be corrected as two reference positions according to the plurality of measured distances;
using the current position to be corrected and the two reference positions to form a reference triangle; and
obtaining a center of gravity position of the reference triangle, and averaging the center of gravity position with the current position to be corrected to obtain an initial guess position of the current position to be corrected;
obtaining multiple ones of the initial guess position to input to an optimizer and optimize an objective function, and finding a plurality of corrected positions with relatively smallest errors, wherein the objective function includes an empirical weight associated with a distance error of the measured distances; and
using the plurality of corrected positions as a plurality of positioning results of the plurality of device nodes.

9. The ultra-wideband assisted precise positioning method according to claim 8, wherein the positioning module is a global satellite positioning system module.

10. The ultra-wideband assisted precise positioning method according to claim 8, wherein the positioning module is a WI-FI positioning system module, and the positioning module is further configured to:

perform scanning to obtain an access point list that defines a plurality of WI-FI access points and corresponding received signal strength indication (RSSI) values; and configure the processing circuit to analyze the access point list to obtain a plurality of features, and perform a feature comparison on the plurality of features and WI-FI positioning map data, and use a position with a highest feature similarity as the position to be corrected.

11. The ultra-wideband assisted precise positioning method according to claim 8, wherein a number of the plurality of device nodes is four or more.

12. The ultra-wideband assisted precise positioning method according to claim 8, wherein the plurality of device nodes are further configured to perform a calibration procedure, the calibration procedure including:

measuring distances between the plurality of device nodes through the ultra-wideband module to generate a plurality of distance equations, wherein each of the plurality of distance equations includes a plurality of hardware errors of the plurality of device nodes; and obtaining the plurality of hardware errors by solving the plurality of distance equations.

13. The ultra-wideband assisted precise positioning method according to claim 8, wherein the objective function includes the plurality of distance errors and a position error, the plurality of distance errors are errors between a plurality of relative distances of the plurality of corrected positions and the plurality of measured distances, and the position error is an error between the plurality of corrected positions and the plurality of positioning positions to be corrected.

14. The ultra-wideband assisted precise positioning method according to claim 13, wherein the empirical weight is obtained by configuring the plurality of device nodes and the central control device node to perform an optimization process, and the optimization process includes:

setting a plurality of known positions, and generating a plurality of sets of simulated positioning results and a plurality of sets of simulated measurement distances in a normal distribution manner according to the plurality of known positions;

performing the center-of-gravity weighting processing on neighboring points on the plurality of sets of simulated positioning results to obtain a plurality of sets of initial simulated guess positions;

inputting the plurality of sets of initial simulated guess positions and the plurality of sets of simulated measurement distances to the optimizer to optimize the objective function, and setting the empirical weight as a plurality of test values to generate a plurality of sets of test positioning results corresponding to the plurality of test values; and respectively calculating the distance error and the position error of the objective function under the plurality of sets of test positioning results to determine a best one of the plurality test values as the empirical weight.

* * * * *